United States Patent
Eser et al.

(10) Patent No.: US 7,597,092 B2
(45) Date of Patent: Oct. 6, 2009

(54) INTERNAL COMBUSTION ENGINE AND METHOD FOR CONTROLLING A SUPERCHARGED INTERNAL COMBUSTION ENGINE

(75) Inventors: Gerhard Eser, Hemau (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 193 days.

(21) Appl. No.: 10/570,007

(22) PCT Filed: Mar. 30, 2005

(86) PCT No.: PCT/EP2005/051436

§ 371 (c)(1),
(2), (4) Date: Feb. 28, 2006

(87) PCT Pub. No.: WO2006/000472

PCT Pub. Date: Jan. 5, 2006

(65) Prior Publication Data

US 2008/0190405 A1    Aug. 14, 2008

(30) Foreign Application Priority Data

Jun. 24, 2004    (DE) .................. 10 2004 030 605

(51) Int. Cl.
    *F02D 41/00* (2006.01)
    *F01L 1/34* (2006.01)
(52) U.S. Cl. .............. 123/676; 123/679; 123/90.15; 123/90.16; 123/90.17
(58) Field of Classification Search ............ 123/676, 123/679, 689, 90.15, 90.16, 90.17; 73/114.72, 73/116
See application file for complete search history.

(56) References Cited

U.S. PATENT DOCUMENTS

| 4,683,857 | A | 8/1987 | Yasuoka |
| 5,289,717 | A * | 3/1994 | Ishida ...................... 73/114.72 |
| 6,250,283 | B1 | 6/2001 | Russell et al. |
| 6,474,323 | B1 | 11/2002 | Beck et al. |
| 6,945,225 | B2 | 9/2005 | Russell et al. |
| 6,945,227 | B2 | 9/2005 | Russell et al. |
| 2002/0062687 | A1 * | 5/2002 | Reed et al. ..................... 73/116 |

FOREIGN PATENT DOCUMENTS

| DE | 100 51 416 A1 | 5/2001 |
| DE | 100 51 425 A1 | 5/2001 |
| DE | 100 50 059 A1 | 6/2001 |
| DE | 102 59 052 B3 | 4/2004 |
| DE | 102 56 474 B3 | 5/2004 |
| DE | 103 00 794 A1 | 7/2004 |
| EP | 0 417 984 B1 | 3/1991 |
| EP | 1 091 106 A2 | 4/2001 |
| EP | 1 243 779 A2 | 9/2002 |

* cited by examiner

*Primary Examiner*—Stephen K Cronin
*Assistant Examiner*—J. Page Hufty
(74) *Attorney, Agent, or Firm*—King & Spalding L.L.P.

(57) ABSTRACT

The invention relates to n internal combustion engine and method for controlling a supercharged internal combustion engine, wherein a deviation of the actual lambda value from a calculated lambda value is detected. The value for the exhaust back pressure is corrected subject to the detected deviation for the event of a valve overlap, when the gas exchange valves of the burner head are simultaneously open. The corrected value for the exhaust back pressure is used to determine the air volume in the cylinder.

16 Claims, 2 Drawing Sheets

INTERNAL COMBUSTION ENGINE AND METHOD FOR CONTROLLING A SUPERCHARGED INTERNAL COMBUSTION ENGINE

CROSS REFERENCE TO RELATED APPLICATIONS

This application is the US National Stage of International Application No. PCT/EP2005/051436, filed Mar. 30, 2005 and claims the benefit thereof. The International Application claims the benefits of German Patent application No. 10 2004 030 605.2 DE filed Jun. 24, 2004. All of the applications are incorporated by reference herein in their entirety.

FIELD OF THE INVENTION

The invention relates to a method for controlling a supercharged internal combustion engine.

BACKGROUND OF THE INVENTION

From DE 100 50 059 A1, a cylinder air charging control system is known that adjusts inlet and outlet valves relative to a demand torque. When using a turbocharger, it is therefore proposed that the control device for inlet and outlet valves is opened simultaneously to avoid the delay during a torque increase, so that with a positive pressure difference between the intake and exhaust sides a flushing of the intake air to the exhaust side takes place.

From DE 100 51 416 A1, a method for controlling an internal combustion engine is known, that has an electronically controlled intake and exhaust device. To achieve a rapid change in the air/fuel ratio in the individual cylinders, the exhaust control device is used to control the airflow from the intake manifold into the cylinder.

From DE 100 51 425 A1, an engine control system for a direct-injection engine with variable valve timing is known. With this method, the fresh air charge in the cylinder is controlled faster with the aid of a cam control than would be possible by manifold dynamics alone. The method also includes changing the air/fuel ratio in the cylinder and changing the control of the exhaust control device accordingly. To compensate for incorrect calculations, a manifold pressure sensor is provided that calculates a manifold pressure error from the deviation between the detected manifold pressure and the actual manifold pressure.

From EP 1 243 779 A2, a direct-injection internal combustion engine with a turbocharger for reducing the consumption, particularly under full load, is known, whereby residual gas is scavenged from the cylinder to avoid knocking. To do this, the inlet and exhaust valves are opened simultaneously.

The methods previously described have one common disadvantage in that because of the scavenging there is no direct relationship between the measured (and produced therefrom) air volume that flows into the cylinder and the air volume that actually remains in the cylinder. An attempt is made to solve this problem by taking account of the "absorption behavior" of the cylinder. By means of the absorption behavior, the fresh air volume flowing into the cylinder is, for example, applied in relation to the inlet manifold. Other operating variables can also be taken into account.

SUMMARY OF THE INVENTION

The object of this invention is to provide a method that increases the accuracy with which the actual air volume remaining in the cylinder during and/or after scavenging can be determined.

The object is achieved in accordance with the invention by means of a method with the features of the claims. Advantageous embodiments form the object of the subclaims.

With the method in accordance with the invention for controlling a supercharged internal combustion engine, where there is a deviation of the actual lambda value from a precalculated lambda value, the value for the exhaust back pressure is corrected relative to the detected deviation in the event of a valve overlap of the gas exchange valves. A corrected value for the exhaust back pressure is used to determine the air volume in the cylinder. The method in accordance with the invention is based on the knowledge that a deviation of the lambda signal from the set value is mainly due to an incorrect value for the exhaust back pressure.

The method in accordance with the invention thus takes the approach of correcting the volumetric efficiency, i.e. absorption behavior, by adapting the exhaust back pressure that occurs during scavenging. The method in accordance with the invention has the advantage that the original reason for calculating the lambda actual value is corrected to the set value, thus enabling an improved control, for example of the wastegate for the turbocharger, to take place. Also, the air volume and cylinder volume is determined more accurately with the method in accordance with the invention, which leads to an improved adherence to the calculated value for the combustion lambda.

The correction of the value for the exhaust back pressure can take place either synchronously with, or following, scavenging. During scavenging the gas exchange valves are opened simultaneously. With the synchronous correction, the value of the exhaust back pressure is changed during the valve overlap of the gas exchange valves. The value of the exhaust back pressure is corrected for the succeeding valve overlaps by the succeeding correction.

The correction for the value of the exhaust back pressure takes place if the intake pressure in the intake manifold is greater than the exhaust back pressure during the valve overlap. When this condition occurs, the combustion gas is swept from the combustion chamber by an airflow, that takes place from the inlet side through the combustion chamber to the exhaust side. To determine whether there are suitable parameters present for scavenging, the quotient of the inlet manifold pressure and the exhaust back pressure is compared with a predetermined threshold value. If the quotient is above the threshold value, the conditions for scavenging are present. Alternatively, or additionally, the difference between the inlet manifold pressure and the exhaust back pressure can be compared with a predetermined threshold value as a condition for scavenging.

The value for the exhaust back pressure is calculated by a control module that uses the fresh air volume, the injected volume and the position of a wastegate as input variables.

With the method in accordance with the invention, the value of the exhaust back pressure is corrected so that the value is reduced if the lambda actual value is less than the predetermined lambda set value. If it is assumed that the deviation in the lambda value occurs essentially due to a deviation in the air volume, a lambda actual value that is too small means that there was too little total fresh air in the combustion chamber. The incoming fresh air has thus been underestimated, so that this value was set too high relative to the exhaust back pressure. The value for the exhaust back pressure is thus reduced as a correction. The same considerations mean that the value for the exhaust back pressure is increased if the lambda actual value is greater than the lambda set value.

BRIEF DESCRIPTION OF THE DRAWINGS

A preferred form of embodiment of the method in accordance with the invention is explained in more detail below with the aid of illustrations. These are as follows.

DETAILED DESCRIPTION OF THE INVENTION

Figure 1:
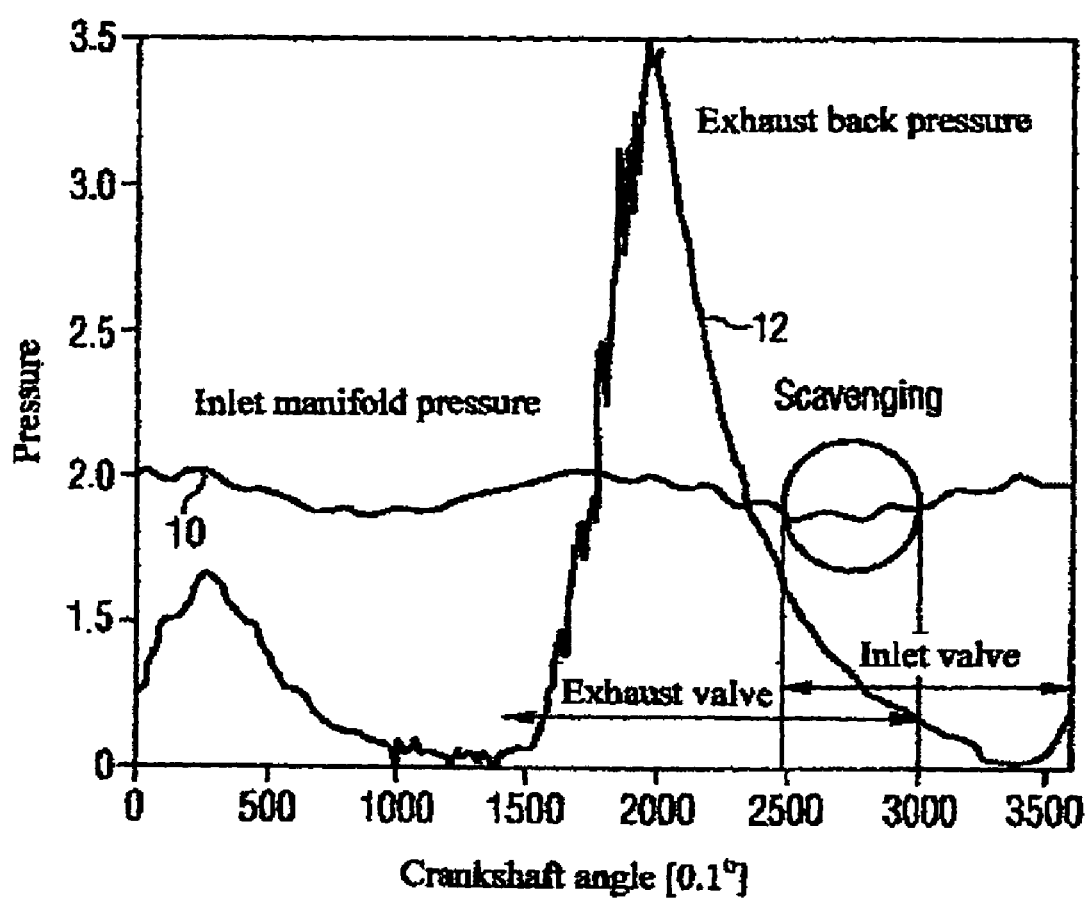
FIG. 1 The pressure pattern of the intake manifold pressure and exhaust back pressure relative to the crankshaft angle and FIG. 2 The establishment of the intake and exhaust configuration of an internal combustion engine with a turbocharger.

FIG. 1 shows an example of the pressure pattern relative to the crankshaft angle, that is shown in FIG. 1 in steps of 0.1° of the crankshaft angle. The intake manifold pressure 10 in this case is essentially constant. The development of the exhaust back pressure 12 over time, that in the earlier of the open gas exhaust valve increases to a clear maximum at a crankshaft angle of approximately 150° to 300° is different. The inlet valve opens within the range of approximately 250° to 360°, so that an overlap occurs in the range from 250° to approximately 300°. In this range, the inlet manifold pressure 10 is distinctly greater than the exhaust back pressure, so that fresh air is scavenged from the intake manifold through the combustion chamber into the exhaust manifold (this process is known as scavenging).

Figure 2:
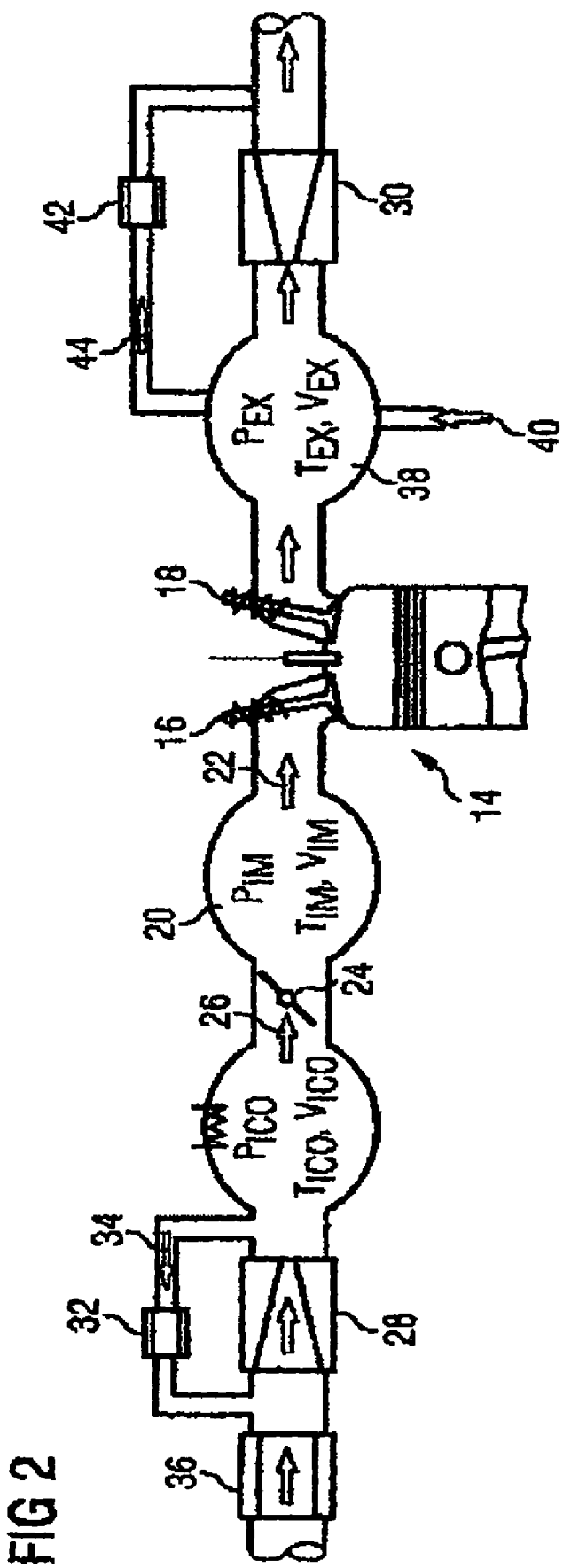

This function is clearly shown in FIG. 2 by means of a schematic arrangement. A cylinder 14 has an inlet valve 16 and exhaust valve 18, that form the gas exchange valves. The valve overlap between the exhaust and inlet valves can, for example, be infinitely varied by means of an infinitely variable valve timing (IVVT) system.

The air volume entering the combustion chamber is described in the intake 20 by the variables pressure, temperature and volume ($P_{IM}$, $T_{IM}$, $V_{IM}$). From these variables, a mass flow 22 into the cylinder ($dm_{cyl}/dt$) is determined.

The mass flow in the intake manifold is controlled by a throttle valve 24, shown schematically, through which a throttle valve air volume flow ($dm_{THR}/dt$) passes.

The internal combustion engine is supercharged by a supercharger 28 driven by a turbine 30 arranged on the exhaust end. A return valve 32, through which the return air volume flow ($dm_{TCL}/dt$) flows back to the intake side of the supercharger, is provided in a bypass of the supercharger 28. An air filter 36 is, for example, fitted upstream of the supercharger.

At the exhaust side of cylinder 14, the state of the exhaust gases is described by pressure, temperature and volume ($P_{EX}$, $T_{EX}$, $V_{EX}$). A secondary airflow 40 can be supplied to the exhaust gas. An air volume ($dm_{WG}/dt$) can bypass the turbine 30 through a wastegate 42.

An exhaust gas catalytic converter (not illustrated), from whose measured values the lambda value for the air/fuel mixture in the cylinder 14 is calculated, is fitted downstream of the turbine 30.

With the intake and exhaust configuration shown, a direct injection of fuel preferably takes place that ensures that the start of injection occurs after the exhaust valve closes. This makes sure that only fresh air without fuel is scavenged to the exhaust side during a valve overlap.

The mass flow through the exhaust gas turbine 30 arranged at the exhaust side is increased by the additional scavenge air, thus substantially improving the achievable maximum power and the dynamic behavior of the turbocharger. Thus, the response behavior of the exhaust gas turbocharger can be improved, particularly at lower engine speeds.

When a supercharged internal combustion engine is operating close to full load, the fresh air scavenged to the exhaust side during a valve overlap causes an increase in the throughput through the internal combustion engine, without participating in the combustion. During this process, the following advantages, in particular, occur with regard to the operating behavior:

At a lambda value of $\lambda_{EX}=1$, combustion in the cylinder with a lambda value of $\lambda_{CYL}<1$ takes place in the case of scavenge air. The combustion in the rich area reduces the tendency to knock.

$\lambda_{CYL}<1$ causes a very high amount of CO and HC in the exhaust gas. At the same time, the amount of scavenge air results in a high residual oxygen content and thus causes an internal secondary air effect. The resulting exhaust gas composition causes a high exothermy in the exhaust gas catalytic converter and thus accelerates its heating up.

The scavenging reduces the amount of residual gas in the combustion chamber and thus the tendency to knock. The minimizing of the amount of residual gas is of decisive importance when operating close to full load, in order to achieve maximum cylinder charging and also to effectively implement this charge, i.e. with a favorable combustion center of gravity.

The additional amount of scavenged air increases the mass flow through the turbine, which means that at low engine speeds both the response behavior and the achievable maximum power can be increased.

The air volume scavenged through the cylinder 14 depends mainly on the pressure differential $P_{IM}$ and $P_{EX}$. This effect is also supported by any resonances that possibly occur in the intake manifold, that can lead to scavenging even at low intake manifold pressure. In event of scavenging, the inexact prediction of the air volume remaining in the cylinder can cause a deviation in the lambda signal from the set value. This deviation is originally due to the fuel volume supplied relative to the air volume. In the event of the air volume deviating from the predicted value, the injected amount is also corrected correspondingly via lambda. This deviation is, however, mainly caused by the exhaust back pressure, because the main relationship is based on the pressure drop. For control, therefore, the value of the exhaust back pressure is corrected on the basis of the measured lambda values.

The corrected value for the exhaust back pressure also enables a more precise control of the wastegate 42 for the turbocharger 30.

The invention claimed is:

1. A method for determining air volume in a cylinder for controlling a supercharged internal combustion engine, comprising:

calculating an anticipated lambda value of the exhaust gas of the internal combustion engine where an intake valve and an exhaust valve of a cylinder in the internal combustion engine open simultaneously to create a valve overlap event, the anticipated lambda value calculation using an exhaust gas back-pressure value;

determining an actual lambda value of the exhaust gas for the internal combustion engine;

detecting a lambda value deviation between the actual lambda value and the anticipated lambda value;

correcting the exhaust gas back-pressure value used in the anticipated lambda value calculation based on the lambda value deviation; and determining a volume of air in the cylinder using the corrected exhaust gas back-pressure value.

2. The method as claimed in claim 1, wherein the exhaust back-pressure correction calculation is performed when an intake manifold pressure is greater than an exhaust back pressure during the valve overlap event.

3. The method as claimed in claim 1, wherein the exhaust back-pressure correction calculation is performed if a quotient of the intake manifold pressure and exhaust back-pressure is greater than a calculated threshold value.

4. The method as claimed in claim 1, wherein the exhaust back-pressure correction calculation is performed if the difference between the intake manifold pressure and exhaust back-pressure exceeds a predetermined threshold value.

5. The method as claimed in claim 1, wherein the exhaust back-pressure value is calculated by a control module using a fresh air volume, an injected volume and a wastegate position as input variables.

6. The method as claimed in claim 1, wherein the exhaust back-pressure value is reduced if the actual lambda value is less than the anticipated lambda value.

7. The method as claimed in claim 1, wherein the exhaust back-pressure value is increased if the actual lambda value is greater than the anticipated lambda value.

8. The method as claimed in claim 1, wherein the exhaust back-pressure value is corrected during the valve overlap event.

9. The method as claimed in claim 1, wherein the exhaust back-pressure value is corrected for a succeeding valve overlap event.

10. The method as claimed in claim 1, wherein the intake and exhaust valves are controlled by an infinitely variable valve timing system.

11. The method as claimed in claim 1, wherein the engine is supercharged by a turbocharger.

12. A supercharged internal combustion engine, comprising:

a cylinder having an inlet valve and an exhaust valve, the inlet vale configured to allow inlet of an intake air flow into the cylinder and the exhaust valve configured to allow expulsion of exhaust gas from the cylinder;

an intake manifold arranged between a throttle valve and the inlet valve;

a supercharger arranged upstream of the inlet;

a lambda sensor arranged downstream of the exhaust valve to determine an actual lambda value of the exhaust gas; and an engine control module that controls a plurality of engine operating parameters wherein the engine control module:

calculates an anticipated lambda value of the exhaust gas using an exhaust gas back-pressure value when the intake and exhaust valve open simultaneously resulting in a valve overlap condition, determines a lambda value deviation between the actual lambda value and the anticipated lambda value, correcting an exhaust gas back-pressure value used in the anticipated lambda value pre-calculation based on the lambda value deviation, and determining a volume of air in the cylinder using the corrected exhaust gas back-pressure value.

13. The engine as claimed in claim 12, wherein the exhaust back-pressure value is reduced if the actual lambda value is less than the anticipated lambda value.

14. The method as claimed in claim 12, wherein the exhaust back-pressure value is increased if the actual lambda value is greater than the anticipated lambda value.

15. The method as claimed in claim 12, wherein the exhaust back-pressure value is corrected during the valve overlap event.

16. The method as claimed in claim 12, wherein the exhaust back-pressure value is corrected for succeeding valve overlap event.

* * * * *